(12) United States Patent
Ishikura et al.

(10) Patent No.: US 12,368,373 B2
(45) Date of Patent: Jul. 22, 2025

(54) SWITCHING POWER SUPPLY DEVICE

(71) Applicant: Murata Manufacturing Co., Ltd., Kyoto-fu (JP)

(72) Inventors: Yuki Ishikura, Nagaokakyo (JP); Hiroyuki Takatsuji, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 273 days.

(21) Appl. No.: 18/335,075

(22) Filed: Jun. 14, 2023

(65) Prior Publication Data

US 2023/0327539 A1 Oct. 12, 2023

Related U.S. Application Data

(63) Continuation of application No. PCT/JP2021/045424, filed on Dec. 10, 2021.

(30) Foreign Application Priority Data

Dec. 21, 2020 (JP) .................................. 2020-210981

(51) Int. Cl.
*H02M 1/12* (2006.01)
*H02M 7/48* (2007.01)

(52) U.S. Cl.
CPC ............ *H02M 1/126* (2013.01); *H02M 7/48* (2013.01)

(58) Field of Classification Search
CPC .............................. H02M 1/126; H02M 7/48
See application file for complete search history.

(56) References Cited

U.S. PATENT DOCUMENTS

| 2004/0240236 A1* | 12/2004 | Lanni | ...................... | H02M 1/12 |
| | | | | 363/39 |
| 2017/0207763 A1* | 7/2017 | Li | ............................ | H02P 27/06 |
| 2020/0204058 A1* | 6/2020 | Lindenberger | .......... | H02M 1/44 |
| 2020/0321856 A1* | 10/2020 | Takatsuji | ............. | H03H 7/0115 |

FOREIGN PATENT DOCUMENTS

| JP | 2011-147238 A | 7/2011 |
| JP | 2012-065515 A | 3/2012 |
| JP | 2015-204407 A | 11/2015 |
| JP | 2015-220953 A | 12/2015 |
| JP | 2016-158316 A | 9/2016 |
| JP | 2016-208596 A | 12/2016 |
| JP | 2018-046677 A | 3/2018 |
| JP | 2018-191369 A | 11/2018 |
| WO | 2018/066176 A1 | 4/2018 |

OTHER PUBLICATIONS

International Search Report issued in PCT/JP2021/045424; mailed Feb. 22, 2022.

* cited by examiner

*Primary Examiner* — Gary A Nash
(74) *Attorney, Agent, or Firm* — Studebaker Brackett PLLC (57) ABSTRACT

A switching power supply device includes an inverter circuit and a noise reduction circuit. The noise reduction circuit includes a first half-bridge capacitor circuit coupled to the DC input line, a second half-bridge capacitor circuit coupled to the AC output line, a first common-mode choke coil coupled between the first half-bridge capacitor circuit and the second half-bridge capacitor circuit, and an electrical path that electrically couples a middle point of the first half-bridge capacitor circuit with a middle point of the second half-bridge capacitor circuit.

20 Claims, 7 Drawing Sheets

SWITCHING POWER SUPPLY DEVICE

CROSS-REFERENCE TO RELATED APPLICATIONS

This application claims benefit of priority to International Patent Application No. PCT/JP2021/045424, filed Dec. 10, 2021, and to Japanese Patent Application No. 2020-210981, filed Dec. 21, 2020, the entire contents of each are incorporated herein by reference.

BACKGROUND

Technical Field

The present disclosure relates to a switching power supply device including an inverter circuit and a noise reduction circuit.

Background Art

An inverter circuit is a circuit that converts DC input power from a DC input line to AC power by using a switching circuit and then outputs the AC power to an AC output line, and a potential from the DC input line is substantially floating relative to the ground potential. Electromagnetic noise attributed to a switching operation is thus overlapped in the DC potential portion. This causes common-mode noise, and electromagnetic interference (EMI) comes to an issue. Accordingly, a switching power supply device including an inverter circuit is typically provided with a noise reduction circuit to reduce the EMI.

SUMMARY

For example, Japanese Unexamined Patent Application Publication No. 2016-208596 discloses a power transmission device including an anti-EMI circuit together with an inverter circuit. A first Y capacitor of an anti-EMI circuit of the power transmission device is not coupled to the ground and is coupled to a power line between an AC line and the inverter circuit. A wiring line coupled to the power line is not coupled to the ground, and a long wiring line has a high impedance. If there is a detection signal line for a voltage or a current near the wiring line having the high impedance, the signal line receives noise from the wiring line having the high impedance and is not able to detect the voltage or the current correctly. A measure such as changing the designing of the inverter circuit is thus required, and extension of the designing period comes to an issue.

However, measures against noise for the switching power supply device are typically implemented after the designing of the inverter circuit is completed. If the anti-EMI circuit is adjusted to cope with noise, the adjustment influences the operation of a feedback control circuit of the inverter circuit. Accordingly, for example, the inverter circuit wrongly operates, and the necessity for redesigning the inverter circuit to prevent the wrong operation arises. A new problem such as a longer designing period thus also arises. In addition, a measure such as adding a large anti-EMI circuit is required, and making the switching power supply device larger comes to an issue.

In addition, the capacitance of the Y capacitor is required to be increased to reduce the EMI; however, increasing the capacitance of the Y capacitor exerts a bad effect on the feedback control of the inverter and causes a problem of a wrong power conversion operation on occasions. In addition, increasing the capacitance of the Y capacitor coupled to the ground leads to an increase of leakage current, and a problem such as higher risk of an electric shock also arises.

As described above, the switching power supply device including the inverter circuit is required to simultaneously achieve the EMI reduction, power integrity (ensuring a power supply quality), shortening the designing period of the switching power supply device, and the like.

Accordingly, the present disclosure reduces the influence of common-mode noise on a feedback control in a switching power supply device including an inverter circuit and a feedback control circuit.

A switching power supply device as an example of the present disclosure includes an inverter circuit and a noise reduction circuit. The inverter circuit is provided with a DC input line, an AC output line, an inductor, a switching circuit that allows switching current to flow to the inductor, an input capacitor coupled in parallel to the DC input line, an output capacitor coupled in parallel to the AC output line, a DC input-voltage detection circuit that detects a voltage across the DC input line, an AC output-voltage detection circuit that detects a voltage across the AC output line, an AC output-current detection circuit that detects current to the AC output line, and a feedback control circuit a reference potential of which is coupled to a reference potential line of the DC input line and that performs control of the switching circuit to cause an AC output voltage across or AC output current to the AC output line to take on a predetermined value based on the DC input voltage. The noise reduction circuit includes a first half-bridge capacitor circuit coupled to the DC input line, a second half-bridge capacitor circuit coupled to the AC output line, a first common-mode choke coil coupled between the first half-bridge capacitor circuit and the second half-bridge capacitor circuit, and an electrical path that electrically couples a middle point of the first half-bridge capacitor circuit with a middle point of the second half-bridge capacitor circuit and that forms a noise balance circuit that balances common-mode noise having a potential different from ground.

With this configuration, the noise balance circuit reduces the influence of the common-mode noise on the feedback control circuit.

According to the present disclosure, in the switching power supply device including the inverter circuit and the feedback control circuit, the influence of the common-mode noise on the feedback control can be reduced.

DETAILED DESCRIPTION

Hereinafter, a plurality of embodiments for implementing the present disclosure will be described by taking some specific examples with reference to the drawings. The same components are denoted by the same reference numerals throughout the drawings. For convenience of explanation and in consideration for easy explanation or understanding of the gist, an embodiment is divided into the plurality of embodiments in the description; however, configurations described in the respective different embodiments may be partially replaced or combined with each other. In the embodiments on and after a second embodiment, description of matters common to those in a first embodiment is omitted, and only different points are described. In particular, the same actions and effects of the same configuration are not referred to one by one in each embodiment.

First Embodiment

Figure 1:
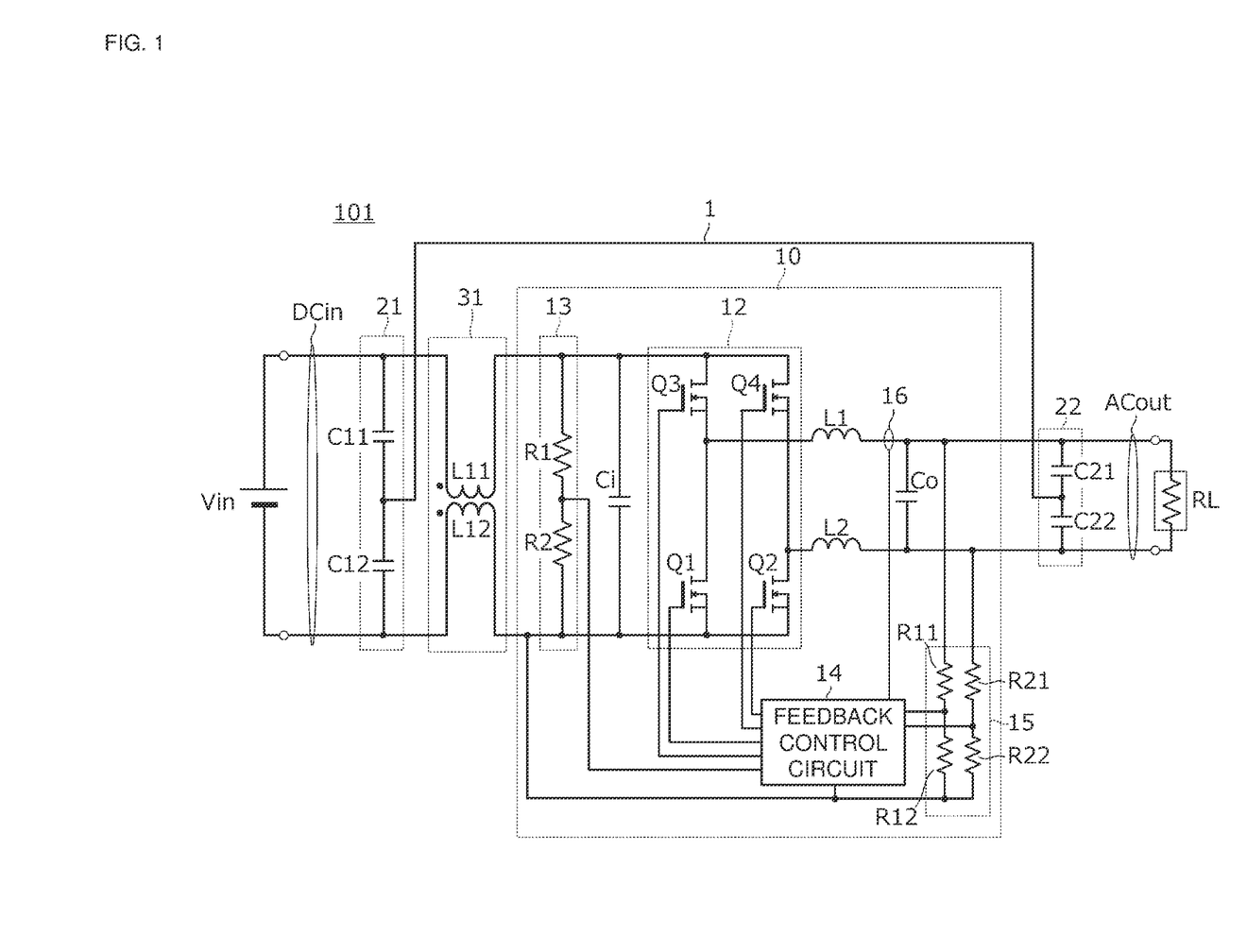
FIG. 1 is a circuit diagram of a switching power supply device according to a first embodiment.

FIG. 1 is a circuit diagram of a switching power supply device 101 according to a first embodiment. The switching power supply device 101 is coupled between a DC power supply Vin and a load circuit RL. A commercial power system may be coupled to the load circuit RL. The switching power supply device 101 includes an inverter circuit 10 and a noise reduction circuit.

The inverter circuit 10 is provided with a DC input line DCin, an AC output line ACout, inductors L1 and L2, a switching circuit 12 that allows switching current to flow to the inductors L1 and L2, an input capacitor Ci coupled in parallel to the DC input line DCin, an output capacitor Co coupled in parallel to the AC output line ACout, a DC input-voltage detection circuit 13 that detects a voltage across the DC input line DCin, an AC output-voltage detection circuit 15 that detects a voltage across the AC output line ACout, an AC output-current detection circuit 16 that detects current to the AC output line ACout, and a feedback control circuit 14. The feedback control circuit 14 is formed from a digital circuit such as an analog circuit, a micro controller unit (MCU), or a digital signal processor (DSP).

The feedback control circuit 14 has a reference potential coupled to a line having the reference potential of the DC input line DCin and performs control of the switching circuit 12 to cause an AC output voltage from or AC output current to the AC output line ACout to take on a predetermined value based on the DC input voltage.

The noise reduction circuit includes a first half-bridge capacitor circuit 21 coupled to the DC input line DCin, a second half-bridge capacitor circuit 22 coupled to the AC output line ACout, a first common-mode choke coil 31 coupled between the first half-bridge capacitor circuit 21 and the second half-bridge capacitor circuit 22, and an electrical path 1 that electrically couples the middle point of the first half-bridge capacitor circuit 21 with the middle point of the second half-bridge capacitor circuit 22. The first common-mode choke coil 31 includes coils L11 and L12 that are mutually magnetically coupled. The first half-bridge capacitor circuit 21, the second half-bridge capacitor circuit 22, and the electrical path 1 form a noise balance circuit that balances common-mode noise having a potential different from the ground. In other words, the noise reduction circuit includes the noise balance circuit and the first common-mode choke coil 31.

The noise balance circuit above reduces the influence of the common-mode noise on the feedback control circuit 14. The middle point of the first half-bridge capacitor circuit 21 has the midpoint potential of the DC input line DCin, and the middle point of the second half-bridge capacitor circuit 22 has the midpoint potential of the AC output line ACout. Common connection between the midpoint potential portions is performed with the electrical path 1 interposed therebetween, and current having a common-mode noise component generated in the switching circuit 12 thereby flows between the DC input line Dcin and the AC output line ACout via the electrical path 1. The common-mode noise has a relatively high frequency and does not have aligned phases. Accordingly, the common-mode noises flow through the electrical path 1 and thereby cancel each other. The common-mode noises having a potential different from the ground are thereby balanced.

The electrical path 1 is preferably formed from a metal plate. This reduces a voltage drop due to the electrical path 1 and thus leads to a smaller potential difference between the middle point of the first half-bridge capacitor circuit 21 and the middle point of the second half-bridge capacitor circuit 22. The balancing of the common-mode noise above thus acts more effectively.

The first common-mode choke coil 31 is coupled between the first half-bridge capacitor circuit 21 and the second half-bridge capacitor circuit 22. The first common-mode choke coil 31 makes low the current having the common-mode noise component generated in the switching circuit 12 and reduces the influence of the common-mode noise on the feedback control circuit 14.

For a measure against EMI, the capacitances of capacitors C11, C12, C21, and C22 are required to be optimized. Adjusting (changing) the capacitor capacities influences the feedback control circuit 14 in the related art. In this case, the feedback control circuit 14 is required to be redesigned, and the designing period is made longer. According to this embodiment, due to such an action that current having the common-mode noise component generated in the switching circuit 12 flows between the input DC line and the output AC line via the electrical path 1 and becomes low, the feedback control circuit 14 has a low impact.

As described above, the designing period can be shorted, the safety can be ensured, and a small and inexpensive switching power supply device can be provided. That is, the switching power supply device 101 including the inverter circuit and the feedback control circuit can reduce the influence of the common-mode noise on the feedback control and also exert the following actions and effects. In the case where the capacitances of the capacitors included in the anti-EMI circuit are adjusted (optimized), the switching power supply device 101 can lead to a shorter designing period and ensure safety in such a manner as to achieve the power conversion operation without increasing leakage current. Further, the switching power supply device 101 can achieve a small and inexpensive configuration.

Second Embodiment

For a second embodiment, a switching power supply device having impedance elements coupled to the electrical path 1 will be exemplified.

Figure 2:
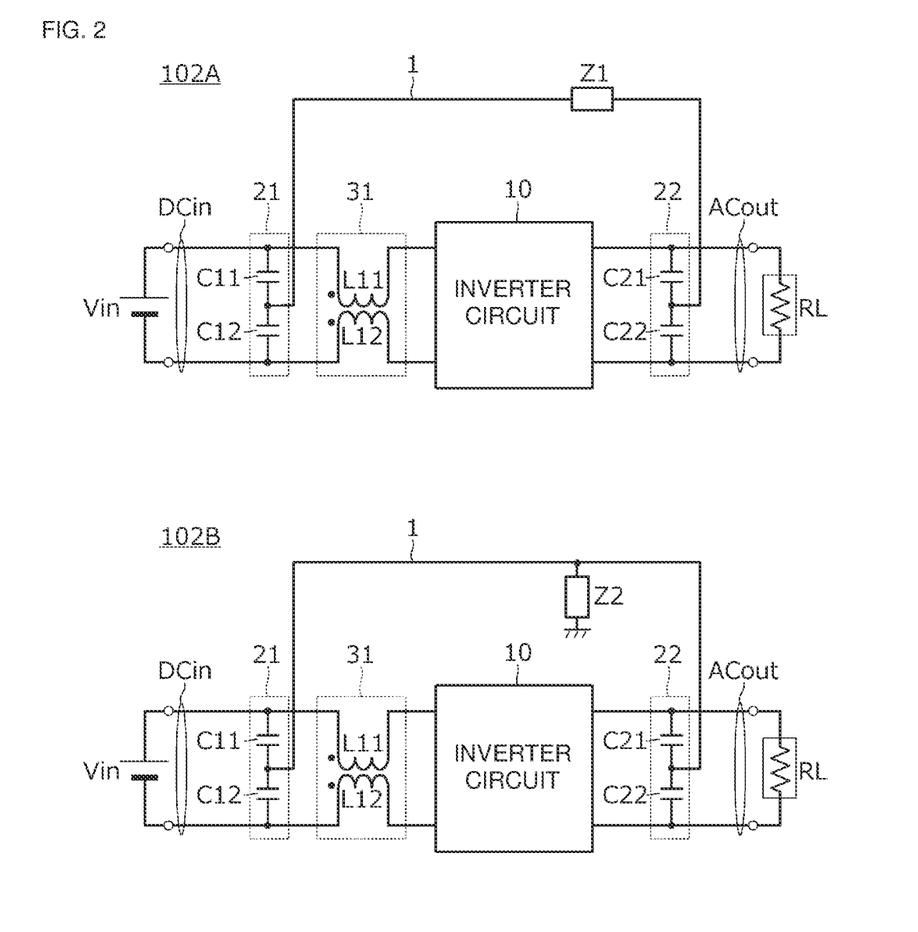
FIG. 2 is a circuit diagram of switching power supply devices according to a second embodiment.

FIG. 2 is a circuit diagram of switching power supply devices 102A and 102B according to the second embodiment. The switching power supply devices 102A and 102B each include the inverter circuit 10, the first half-bridge capacitor circuit 21, the second half-bridge capacitor circuit 22, and the first common-mode choke coil 31. The switching power supply devices 102A and 102B each also include the electrical path 1 electrically coupling the middle point of the first half-bridge capacitor circuit 21 with the middle point of the second half-bridge capacitor circuit 22.

To the electrical path 1 of the switching power supply device 102A, an impedance element Z1 is coupled in series.

The impedance element Z1 has at least an inductance component or a resistance component.

An impedance element Z2 is coupled between the electrical path 1 of the switching power supply device 102B and the ground. The impedance element Z2 has at least a capacitance component, an inductance component, or resistance component. The "ground" is the earth or the fame ground.

Like the switching power supply device 102A, if the impedance element Z1 is coupled in series to the electrical path 1, but if the common-mode noise reduction effect exerted by the first common-mode choke coil 31 is not sufficient, the impedance element Z1 supplements the common-mode noise reduction. That is, the impedance element Z1 attenuates the vibration of high-frequency common-mode current flowing through the electrical path 1, and thus the common-mode noise is reduced.

In the switching power supply device 102B, the impedance element Z2 is coupled between the electrical path 1 and the ground. The impedance element Z2 has at least a capacitance component, an inductance component, or a resistance component.

As described above, if the impedance element Z2 is coupled between the electrical path 1 and the ground, but if the common-mode noise reduction effect exerted by the first common-mode choke coil 31 is not sufficient, the impedance element Z2 supplements the common-mode noise reduction. That is, the common-mode current flowing through the electrical path 1 to balance the first half-bridge capacitor circuit 21 and the second half-bridge capacitor circuit 22 flows to the ground via the impedance element Z2. If a line bypass capacitor circuit is provided, the aforementioned current (leakage current) is less than current leaking from the line bypass capacitor circuit to the ground. Accordingly, the leakage current can be reduced, and the common-mode noise can also be reduced.

Figure 3:
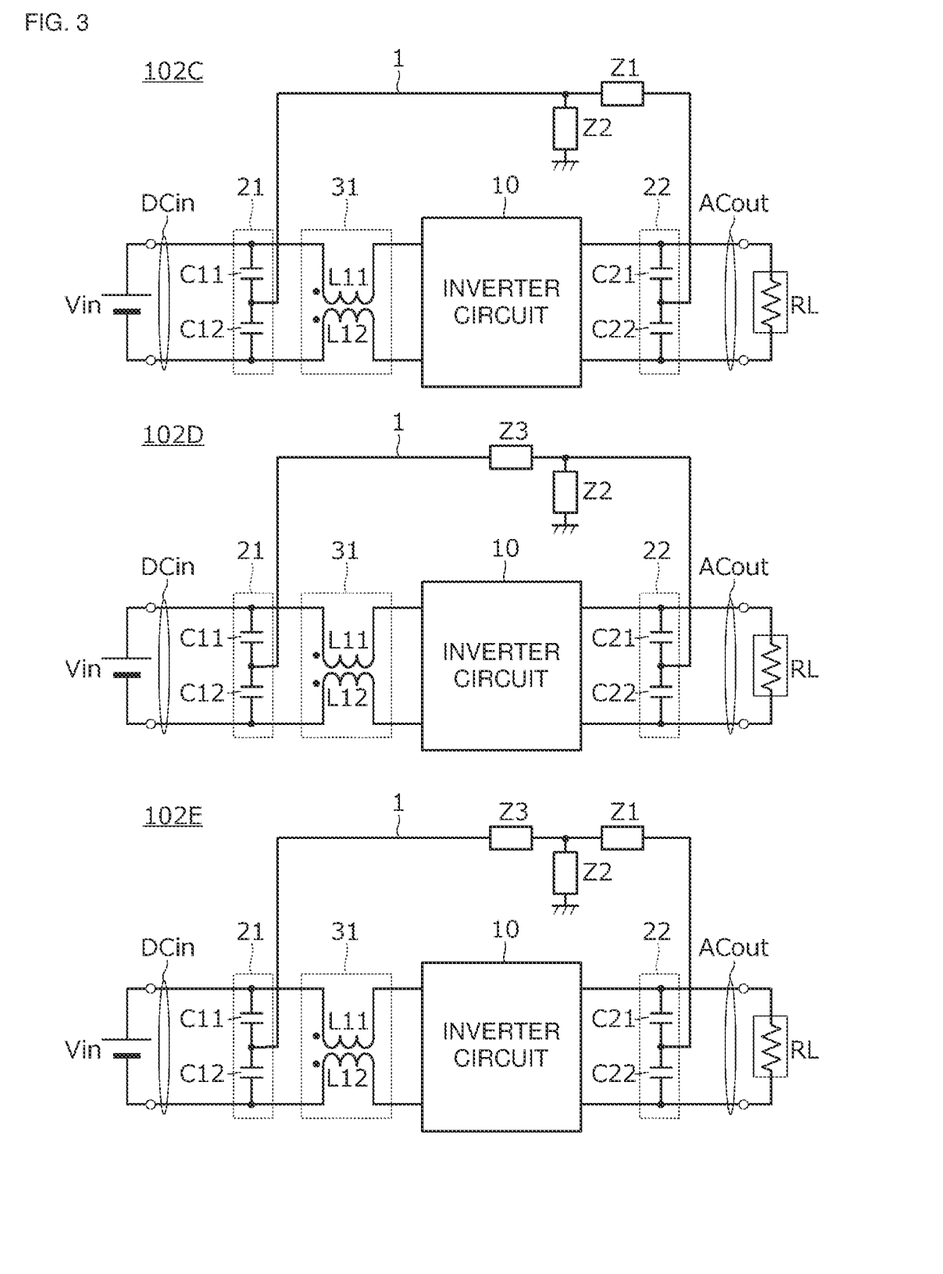
FIG. 3 is a circuit diagram of further different switching power supply devices according to the second embodiment.

FIG. 3 is a circuit diagram of further different switching power supply devices 102C, 102D, and 102E according to the second embodiment. In each of the switching power supply devices 102C, 102D, and 102E, the impedance element Z2 is coupled between the electrical path 1 and the ground.

In the switching power supply device 102C, the impedance element Z1 is coupled in series between the point of coupling of the impedance element Z2 with the electrical path 1 and the middle point of the second half-bridge capacitor circuit 22. In the switching power supply device 102D, an impedance element Z3 is also coupled in series between the point of coupling of the impedance element Z2 with the electrical path 1 and the middle point of the first half-bridge capacitor circuit 21. In the switching power supply device 102E, the impedance element Z1 is coupled in series between the point of coupling of the impedance element Z2 with the electrical path 1 and the middle point of the second half-bridge capacitor circuit 22, and the impedance element Z3 is coupled in series between the point of coupling of the impedance element Z2 with the electrical path 1 and the middle point of the first half-bridge capacitor circuit 21.

In the switching power supply devices 102C, 102D, and 102E illustrated FIG. 3, if the impedance elements Z1 and Z3 are resistors or inductors, and if the impedance element Z2 is a capacitor, these impedance elements form a low pass filter. If the impedance elements Z1 and Z3 are capacitors, and if the impedance element Z2 is a resistor or an inductor, these impedance elements form a high pass filter.

As described above, if a frequency filter is coupled to the electrical path 1, the feedback responsibility to the common-mode voltage of the DC input line DCin in response to the fluctuation of the common-mode voltage output to the AC output line ACout can be specified appropriately.

Third Embodiment

For a third embodiment, a switching power supply device 103 including a second common-mode choke coil 32 will be exemplified.

Figure 4:
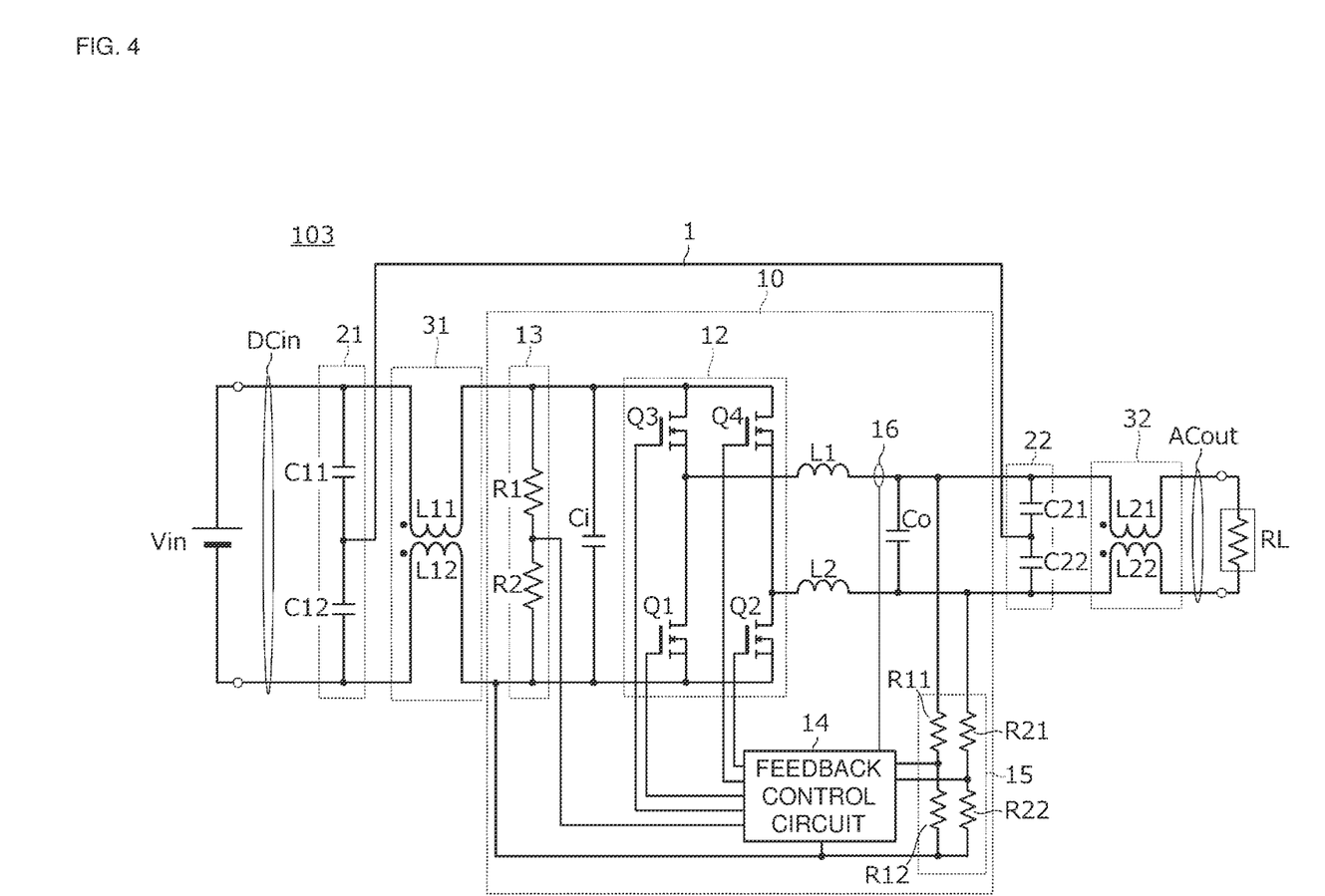
FIG. 4 is a circuit diagram of a switching power supply device according to a third embodiment.

FIG. 4 is a circuit diagram of the switching power supply device 103 according to the third embodiment. The switching power supply device 103 is coupled between the DC power supply Vin and the load circuit RL. The switching power supply device 103 also includes the inverter circuit 10 and the noise reduction circuit. In FIG. 4, circuits other than the inverter circuit 10 form the noise reduction circuit.

The switching power supply device 103 according to the third embodiment includes the second common-mode choke coil 32 coupled on the load side of the second half-bridge capacitor circuit 22. The configuration other than this is the same as that of the switching power supply device 101 illustrated in FIG. 1.

The second common-mode choke coil 32 is composed of coils L21 and L22 that are mutually magnetically coupled. The second common-mode choke coil 32 reduces common-mode noise overlapped in the AC output line ACout of the inverter circuit 10.

Fourth Embodiment

For a fourth embodiment, a switching power supply device to which a capacitor for a filter is coupled will be exemplified, the capacitor being coupled to the AC output line.

Figure 5:
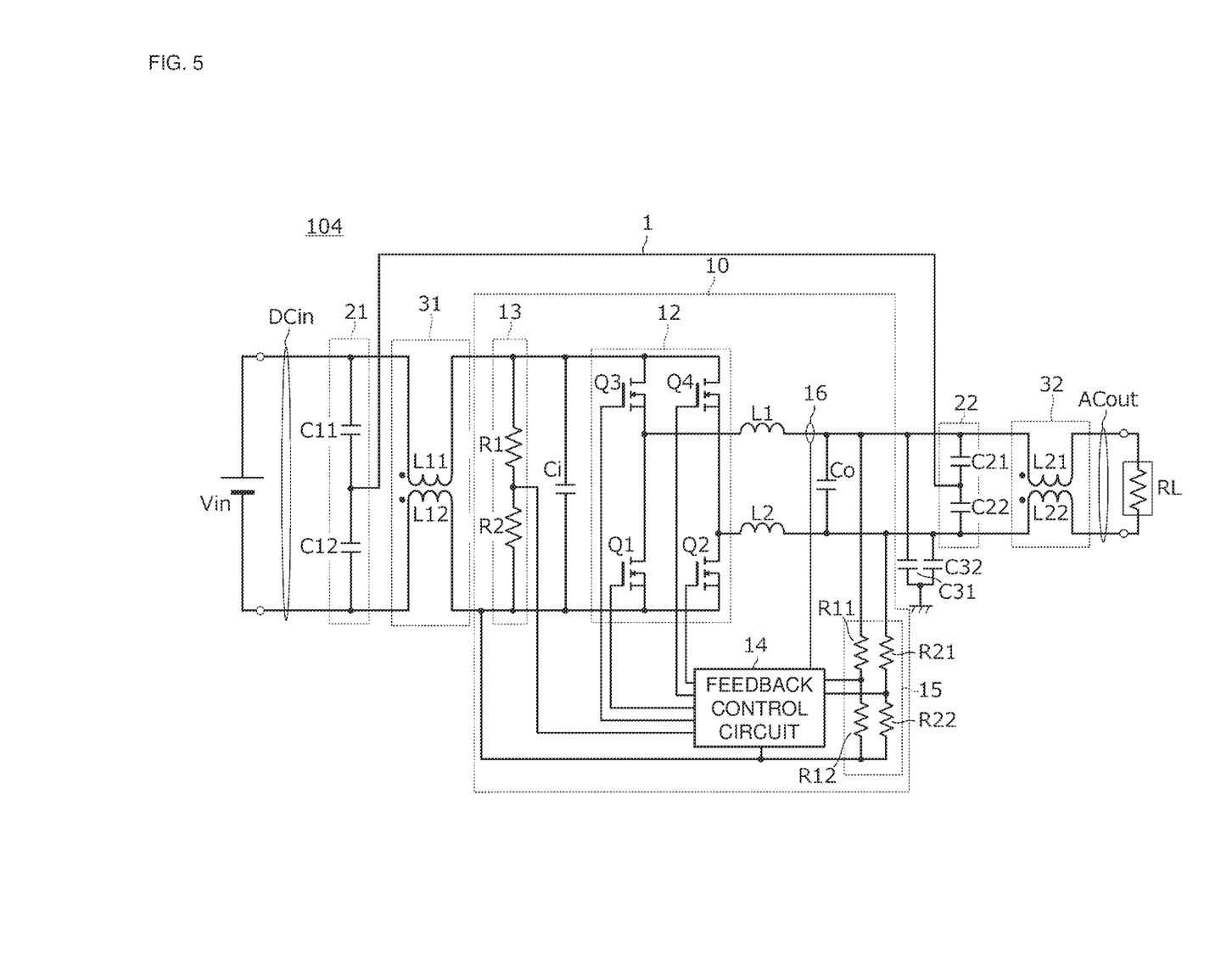
FIG. 5 is a circuit diagram of a switching power supply device according to a fourth embodiment.

FIG. 5 is a circuit diagram of a switching power supply device 104 according to the fourth embodiment. The switching power supply device 104 is coupled between the DC power supply Vin and the load circuit RL. The switching power supply device 104 also includes the inverter circuit 10 and the noise reduction circuit. In FIG. 5, circuits other than the inverter circuit 10 form the noise reduction circuit.

The switching power supply device 104 according to the fourth embodiment includes two capacitors C31 and C32 coupled in series. This circuit is coupled to the AC output line ACout, and the middle point of the circuit is coupled to the ground. The configuration other than this is the same as that of the switching power supply device 103 illustrated in FIG. 4.

The circuit composed of the capacitors C31 and C32 reduces common-mode noise overlapped in the AC output line ACout of the inverter circuit 10.

Fifth Embodiment

For a fifth embodiment, a switching power supply device including a capacitor C4 coupled between the reference potential of the feedback control circuit 14 and the electrical path 1 will be exemplified.

Figure 6:
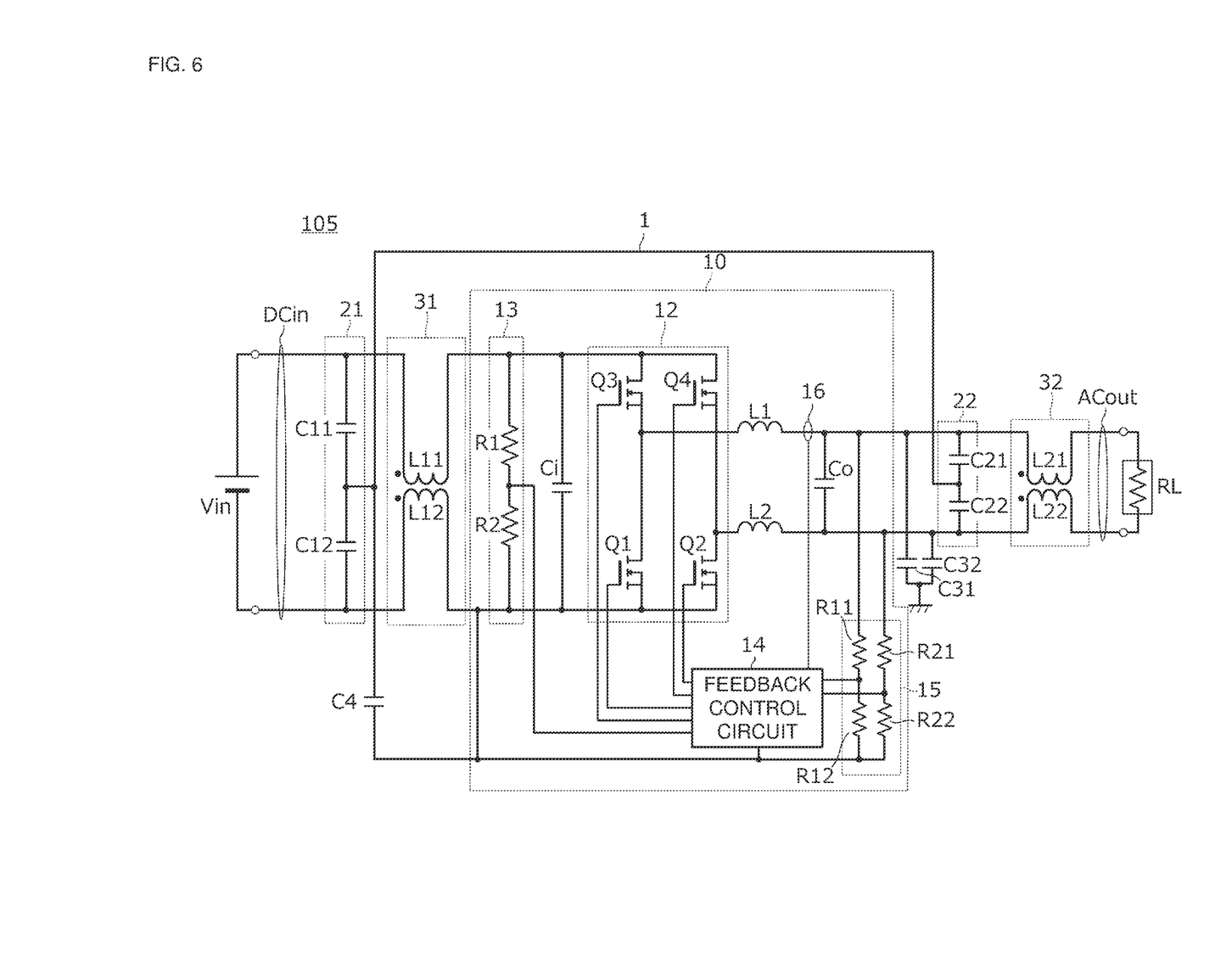
FIG. 6 is a circuit diagram of a switching power supply device according to a fifth embodiment.

FIG. 6 is a circuit diagram of a switching power supply device 105 according to the fifth embodiment. The switching power supply device 105 is coupled between the DC power supply Vin and the load circuit RL. The switching power supply device 105 also includes the inverter circuit 10 and the noise reduction circuit. In FIG. 6, circuits other than the inverter circuit 10 form the noise reduction circuit.

The switching power supply device 105 according to the fifth embodiment includes the capacitor C4 coupled between the reference potential of the feedback control circuit 14 and the electrical path 1. The configuration other than this is the same as that of the switching power supply device 104 illustrated in FIG. 5.

The capacitor C4 is coupled between the reference potential of the feedback control circuit 14 and the electrical path 1, and thereby the potential of the electrical path 1 is stabilized. The common-mode noise can be reduced, and the influence of the electrical path 1 on the detection signal line for a voltage or current can also be reduced.

Sixth Embodiment

For a sixth embodiment, a switching power supply device including a capacitor C5 coupled between the reference potential of the feedback control circuit 14 and the ground will be exemplified.

Figure 7:
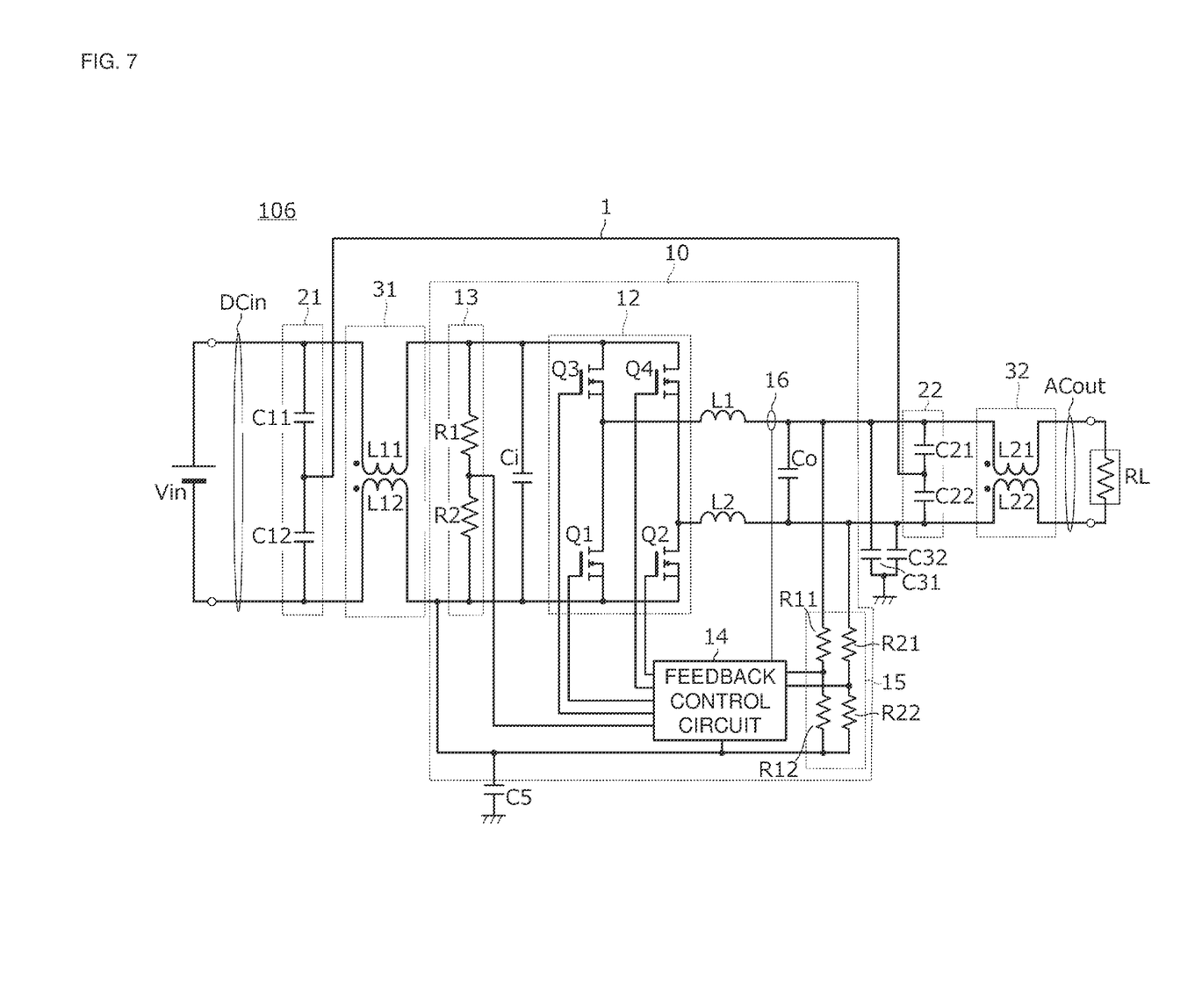
FIG. 7 is a circuit diagram of a switching power supply device according to a sixth embodiment.

FIG. 7 is a circuit diagram of a switching power supply device 106 according to the sixth embodiment. The switching power supply device 106 is coupled between the DC power supply Vin and the load circuit RL. The switching power supply device 106 also includes the inverter circuit 10 and the noise reduction circuit. In FIG. 7, circuits other than the inverter circuit 10 form the noise reduction circuit.

The switching power supply device 106 according to the sixth embodiment includes the capacitor C5 coupled between the reference potential of the feedback control circuit 14 and the ground. The configuration other than this is the same as that of the switching power supply device 104 illustrated in FIG. 5.

The capacitor C5 is coupled between the reference potential of the feedback control circuit 14 and the ground, and thereby the potential of the electrical path 1 is stabilized. The common-mode noise can be reduced, and the influence of the electrical path 1 on the detection signal line for a voltage or current can also be reduced.

Lastly, the present disclosure is not limited to the embodiments described above. Modifications and changes may be made appropriately by those skilled in the art. The scope of the present disclosure is defined by the scope of claims, not by the embodiments above. Further, the scope of the present disclosure includes a modification and a change made from the embodiments in the scope equivalent to the scope of claims.

What is claimed is:

1. A switching power supply device comprising:
   an inverter circuit and a noise reduction circuit,
   wherein
   the inverter circuit includes
      a DC input line,
      an AC output line,
      an inductor,
      a switching circuit configured to allow switching current to flow to the inductor,
      an input capacitor coupled in parallel to the DC input line,
      an output capacitor coupled in parallel to the AC output line,
      a DC input-voltage detection circuit configured to detect a voltage across the DC input line,
      an AC output-voltage detection circuit configured to detect a voltage across the AC output line,
      an AC output-current detection circuit configured to detect current to the AC output line, and
      a feedback control circuit a reference potential of which is coupled to a reference potential line of the DC input line and is configured to control the switching circuit to cause an AC output voltage across or AC output current to the AC output line to take on a predetermined value based on the voltage across the DC input line, and
   the noise reduction circuit includes
      a first half-bridge capacitor circuit coupled to the DC input line,
      a second half-bridge capacitor circuit coupled to the AC output line,
      a first common-mode choke coil coupled between the first half-bridge capacitor circuit and the second half-bridge capacitor circuit, and
      an electrical path that electrically couples a middle point of the first half-bridge capacitor circuit with a middle point of the second half-bridge capacitor circuit and that configures a noise balance circuit that balances common-mode noise having a potential different from ground.

2. The switching power supply device according to claim 1, further comprising:
   an impedance element coupled in series to the electrical path and having an inductance component or a resistance component.

3. The switching power supply device according to claim 2, further comprising:
   an impedance element coupled between the electrical path and the ground and having a capacitance component, an inductance component, or a resistance component.

4. The switching power supply device according to claim 2, further comprising:
   a second common-mode choke coil coupled on a load side of the second half-bridge capacitor circuit.

5. The switching power supply device according to claim 2, further comprising:
   two capacitors coupled in series,
   wherein the two capacitors are coupled to the AC output line and have a middle point coupled to the ground.

6. The switching power supply device according to claim 2, comprising:
   a capacitor coupled between a reference potential of the feedback control circuit and the electrical path.

7. The switching power supply device according to claim 2, further comprising:
   a capacitor coupled between the reference potential of the feedback control circuit and the ground.

8. The switching power supply device according to claim 1, further comprising:
   an impedance element coupled between the electrical path and the ground and having a capacitance component, an inductance component, or a resistance component.

9. The switching power supply device according to claim 8, further comprising:
   a second common-mode choke coil coupled on a load side of the second half-bridge capacitor circuit.

10. The switching power supply device according to claim 1, further comprising:
    a second common-mode choke coil coupled on a load side of the second half-bridge capacitor circuit.

11. The switching power supply device according to claim 1, further comprising:
    two capacitors coupled in series,
    wherein the two capacitors are coupled to the AC output line and have a middle point coupled to the ground.

12. The switching power supply device according to claim 1, comprising:
a capacitor coupled between a reference potential of the feedback control circuit and the electrical path.

13. The switching power supply device according to claim 1, further comprising:
a capacitor coupled between the reference potential of the feedback control circuit and the ground.

14. A switching power supply device comprising:
an inverter circuit and a noise reduction circuit,
wherein
the inverter circuit includes
a DC input line,
an AC output line,
an inductor,
a switching circuit configured to allow switching current to flow to the inductor,
an input capacitor coupled in parallel to the DC input line,
an output capacitor coupled in parallel to the AC output line,
a DC input-voltage detection circuit configured to detect a voltage across the DC input line,
an AC output-voltage detection circuit configured to detect a voltage across the AC output line,
an AC output-current detection circuit configured to detect current to the AC output line, and
a feedback control circuit a reference potential of which is coupled to a reference potential line of the DC input line and is configured to control the switching circuit to cause an AC output voltage across or AC output current to the AC output line to take on a predetermined value based on the voltage across the DC input line,
the noise reduction circuit includes
a first half-bridge capacitor circuit coupled to the DC input line,
a second half-bridge capacitor circuit coupled to the AC output line,
a first common-mode choke coil coupled between the first half-bridge capacitor circuit and the second half-bridge capacitor circuit, and
an electrical path that electrically couples a middle point of the first half-bridge capacitor circuit with a middle point of the second half-bridge capacitor circuit and that configures a noise balance circuit that balances common-mode noise having a potential different from ground, and
the noise balance circuit is configured to reduce influence of the common-mode noise on the feedback control circuit.

15. The switching power supply device according to claim 14, further comprising:
an impedance element coupled in series to the electrical path and having an inductance component or a resistance component.

16. The switching power supply device according to claim 14, further comprising:
an impedance element coupled between the electrical path and the ground and having a capacitance component, an inductance component, or a resistance component.

17. The switching power supply device according to claim 14, further comprising:
a second common-mode choke coil coupled on a load side of the second half-bridge capacitor circuit.

18. The switching power supply device according to claim 14, further comprising:
two capacitors coupled in series,
wherein the two capacitors are coupled to the AC output line and have a middle point coupled to the ground.

19. The switching power supply device according to claim 14, comprising:
a capacitor coupled between a reference potential of the feedback control circuit and the electrical path.

20. The switching power supply device according to claim 14, further comprising:
a capacitor coupled between the reference potential of the feedback control circuit and the ground.

* * * * *